United States Patent
Park et al.

(10) Patent No.: US 9,191,555 B2
(45) Date of Patent: Nov. 17, 2015

(54) IMAGE CAPTURE DEVICE AND SIGNAL COMPENSATING METHOD OF IMAGE CAPTURE DEVICE

(71) Applicant: Samsung Electronics Co., Ltd., Suwon-si, Gyeonggi-Do (KR)

(72) Inventors: Yujin Park, Seoul (KR); Seogheon Ham, Suwon-si (KR); Byung-Jo Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 64 days.

(21) Appl. No.: 13/677,965

(22) Filed: Nov. 15, 2012

(65) Prior Publication Data
US 2013/0250148 A1    Sep. 26, 2013

(30) Foreign Application Priority Data
Mar. 20, 2012 (KR) .................. 10-2012-0028338

(51) Int. Cl.
*H04N 5/217* (2011.01)
*H04N 5/365* (2011.01)

(52) U.S. Cl.
CPC .............. *H04N 5/217* (2013.01); *H04N 5/365* (2013.01)

(58) Field of Classification Search
CPC ....... H04N 5/217; H04N 5/378; H04N 5/365; H03M 1/00
USPC ........................................ 348/241
See application file for complete search history.

(56) References Cited

U.S. PATENT DOCUMENTS

| 5,565,916 | A | | 10/1996 | Katayama et al. |
| 5,943,141 | A | * | 8/1999 | Tamura ........................ 358/461 |
| 6,433,822 | B1 | * | 8/2002 | Clark et al. .................. 348/241 |
| 6,831,686 | B1 | * | 12/2004 | Koren et al. ................. 348/243 |
| 7,477,302 | B2 | | 1/2009 | Hisamatsu et al. |
| 7,746,400 | B2 | | 6/2010 | Mo |
| 8,269,864 | B2 | * | 9/2012 | Gerstenberger et al. ...... 348/243 |
| 8,462,240 | B2 | * | 6/2013 | Osawa et al. ................ 348/294 |
| 2005/0024250 | A1 | * | 2/2005 | Atriss et al. ................. 341/163 |
| 2006/0176382 | A1 | | 8/2006 | Kokubo et al. |
| 2008/0180540 | A1 | | 7/2008 | Kim et al. |
| 2009/0322903 | A1 | * | 12/2009 | Hashimoto et al. ........ 348/229.1 |
| 2009/0322911 | A1 | | 12/2009 | Blanquart |
| 2011/0090238 | A1 | * | 4/2011 | Dong et al. .................. 345/589 |
| 2014/0077986 | A1 | * | 3/2014 | Huang et al. ................. 341/172 |

FOREIGN PATENT DOCUMENTS

| JP | 2002-016841 A | 1/2002 |
| JP | 2006-129273 A | 5/2006 |
| KR | 10-2007-0066465 A | 6/2007 |
| KR | 10-2007-0070990 A | 7/2007 |
| KR | 10-2007-0089466 A | 8/2007 |

* cited by examiner

*Primary Examiner* — Roberto Velez
*Assistant Examiner* — Cynthia Segura
(74) *Attorney, Agent, or Firm* — Harness, Dickey & Pierce, P.L.C.

(57) ABSTRACT

The signal compensating method includes receiving sensing signals from an image sensor pixel array; converting the sensing signals into digital signals using a plurality of analog-to-digital converters, respectively; and compensating the digital signals using offset values corresponding to the plurality of analog-to-digital converters, respectively.

13 Claims, 14 Drawing Sheets

IMAGE CAPTURE DEVICE AND SIGNAL COMPENSATING METHOD OF IMAGE CAPTURE DEVICE

CROSS-REFERENCE TO RELATED APPLICATIONS

A claim for priority under 35 U.S.C. §119 is made to Korean Patent Application No. 10-2012-0028338 filed on Mar. 20, 2012, in the Korean Intellectual Property Office, the entire contents of which are hereby incorporated by reference.

BACKGROUND

Example embodiments described herein relate to an image capture device, and more particularly, relate to a signal compensating method thereof.

Like a camcorder, a camera, and the like, an image capture device may film subjects to acquire images. The image capture device may include a film camera, a film camcorder, a digital camera, and a digital camcorder. Digital image capture devices such as the digital camera and the digital camcorder may acquire images using an image sensor. The image sensor may include a Charge Coupled Device (CCD) and a CMOS Image Sensor (CIS).

The image sensor may include a plurality of image sensor pixels. The image sensor pixels may be arranged to form an array. The image sensor pixels may output analog signals in response to an incident light. The analog signals may be converted into digital signals, and the digital signals may be stored as image data after digital processing.

SUMMARY

Example embodiments provide a signal compensating method of an image capture device which comprises receiving sensing signals from an image sensor pixel array; converting the sensing signals into digital signals using a plurality of analog-to-digital converters, respectively; and compensating the digital signals using offset values corresponding to the plurality of analog-to-digital converters, respectively.

According to at least one example embodiment, a resolution of the offset values is higher than a resolution of the digital signals.

According to at least one example embodiment, a bit number of each of the offset values is more than a bit number of each of the digital signals.

According to at least one example embodiment, the offset values are values set in advance.

According to at least one example embodiment, the signal compensating method further comprises calculating offset values of the plurality of analog-to-digital converters, the compensating being performed using the calculated offset values.

According to at least one example embodiment, the calculating comprises receiving sensing signals from the image sensor pixel array as reference signals when unexposed image sensor pixels are read; converting the reference signals into reference digital signals using the plurality of analog-to-digital converters; and calculating the offset values of the plurality of analog-to-digital converters based on the reference digital signals.

According to at least one example embodiment, the offset values are calculated based on an accumulated average of the reference digital signals.

According to at least one example embodiment, the calculating comprises receiving reference signals from a reference signal generator; converting the reference signals into reference digital signals using the plurality of analog-to-digital converters; and calculating the offset values of the plurality of analog-to-digital converters based on the reference digital signals.

Example embodiments provide an image capture device which comprises an image sensor pixel array including a plurality of image sensor pixels; a signal transfer circuit configured to transfer sensing signals output from the image sensor pixel array; a plurality of analog-to-digital converters configured to convert output signals of the signal transfer circuit into digital signals, respectively; and a signal compensating circuit configured to compensate the digital signals output from the plurality of analog-to-digital converters. The signal compensating circuit comprises a plurality of signal compensators corresponding to the plurality of analog-to-digital converters, respectively. Each of the plurality of signal compensators comprises an offset register configured to store an offset value; and an offset compensator configured to compensate a digital signal output from a corresponding analog-to-digital converter using the offset value stored in the offset register.

According to at least one example embodiment, each of the plurality of signal compensators further comprises an offset calculator configured to calculate the offset value based on a digital signal output from the corresponding analog-to-digital converter.

According to at least one example embodiment, the offset value calculated by the offset calculator is stored at the offset register.

According to at least one example embodiment, the offset calculators calculate the offset values when unexposed image sensor pixels of the image sensor pixel array are read, and the offset compensators compensate the digital signals when exposed image sensor pixels of the image sensor pixel array are read.

According to at least one example embodiment, the signal transfer circuit comprises a plurality of multiplexers corresponding to the plurality of analog-to-digital converters, the plurality of multiplexers being configured to transfer either the sensing signals or reference signals to the plurality of analog-to-digital converters.

According to at least one example embodiment, the plurality of multiplexers transfers the reference signals when unexposed image sensor pixels of the image sensor pixel array are read and transfers the sensing signals when exposed image sensor pixels of the image sensor pixel array are read.

According to at least one example embodiment, the offset calculator calculates the offset value when the signal transfer circuit transfers the reference signals and compensates the digital signals when the signal transfer circuit transfers the sensing signals.

According to at least one example embodiment, a method of operating an image sensor may include receiving plurality of sensing signals from a pixel array of the image sensor; converting the plurality of sensing signals into a plurality of first digital signals using a plurality of analog-to-digital converters, respectively; and generating a plurality of compensated signals based on the plurality of first digital signals and offset values corresponding to each of the plurality of analog-to-digital converters, respectively.

According to at least one example embodiment, generating the plurality of compensated signals may include receiving at least one first reference signal, converting the at least one first reference signal to at least one digital reference signal, and generating the plurality of compensated signals based on the plurality of first digital signals, the at least one digital reference signal and the offset values.

According to at least one example embodiment, the at least one first reference signal may be a signal generated by one or more pixels of the pixel array, the one or more pixels of the pixel array being located in an area of the pixel array which is configured not to receive light.

BRIEF DESCRIPTION OF THE FIGURES

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
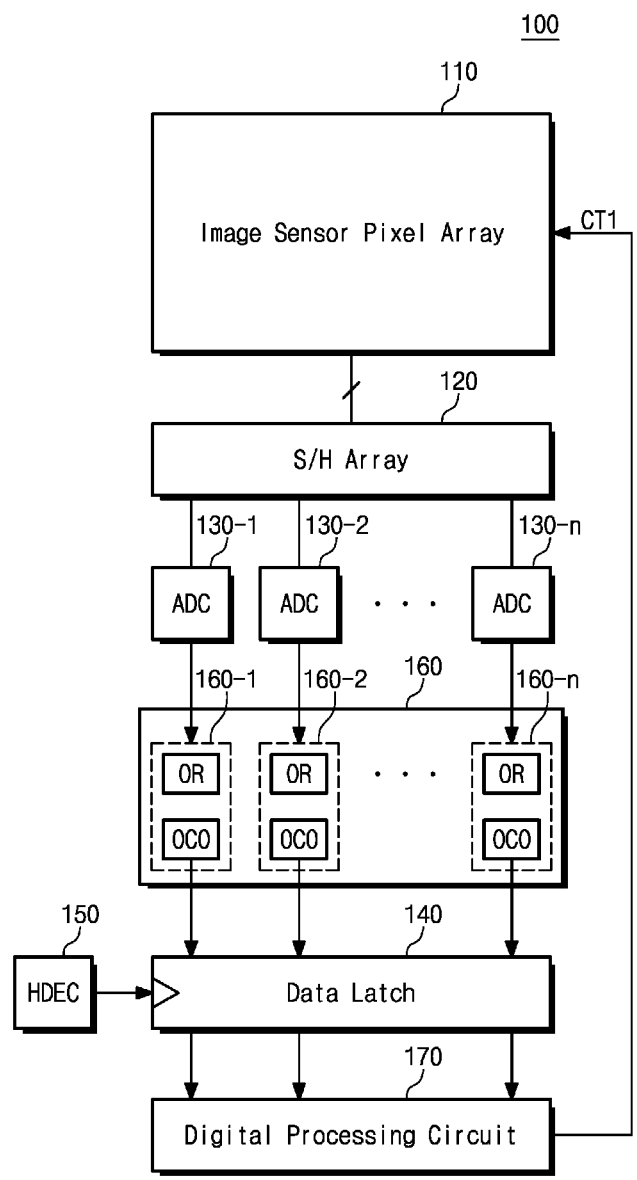
FIG. 1 is a block diagram schematically illustrating an image capture device according to at least one example embodiment.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating an image capture device according to at least one example embodiment. Referring to FIG. 1, an image capture device 100 may include an image sensor pixel array 110, a sample and hold array 120, a plurality of analog-to-digital converters 130-1 to 130-$n$, a data latch 140, a horizontal decoder 150, a digital compensating circuit 160, and a digital processing circuit 170. As used herein, the variable 'n' may represent any positive integer.

The image sensor pixel array 110 may include a plurality of image sensor pixels. The plurality of image sensor pixels may be arranged along rows and columns to form an array. The plurality of image sensor pixels may be CIS (CMOS Image Sensor) or CCD (Charge Coupled Device) pixels.

The image sensor pixel array 110 may read the plurality of image sensor pixels in response to a control signal CT1. The image sensor pixels may output voltages or currents according to an incident light. The image sensor pixel array 110 may read the plurality of image sensor pixels by detecting voltages or currents output from the plurality of image sensor pixels. According to at least one example embodiment, the image sensor pixel array 110 may read the plurality of image sensor pixels by a unit of at least one row or at least one column. A read result on the plurality of image sensor pixels may be output as sensing signals.

The sample and hold array 120 may be connected to the image sensor pixel array 110 through a plurality of conductive lines. The sample and hold array 120 may receive sensing signals via the plurality of conductive lines. The sample and hold array 120 may sample the sensing signals to hold the sampled signals. The sampled and held signals may be output as sensing signals.

The sensing signals may be signals output from the image sensor pixel array 110 or signals output from the image sensor pixel array 110 and sampled and held by the sample and hold array 120.

Conductive lines connecting the sample and hold array 120 and the plurality of analog-to-digital converters 130-1 to 130-n may form a signal transfer circuit which transfers the sensing signals to the plurality of analog-to-digital converters 130-1 to 130-n. Conductive lines connecting the sample and hold array 120 and the image sensor pixel array 110, the sample and hold array 120, and conductive lines connecting the sample and hold array 120 and the plurality of analog-to-digital converters 130-1 to 130-n may form a signal transfer circuit which transfers the sensing signals to the plurality of analog-to-digital converters 130-1 to 130-n.

The plurality of analog-to-digital converters 130-1 to 130-n may receive the sensing signals from the sample and hold array 120 to convert the input sensing signals into digital signals, respectively.

The digital compensating circuit 160 may receive the digital signals from the plurality of analog-to-digital converters 130-1 to 130-n. The digital compensating circuit 160 may include a plurality of digital compensators 160-1 to 160-n corresponding to the plurality of analog-to-digital converters 130-1 to 130-n, respectively.

The plurality of digital compensators 160-1 to 160-n may be configured to adjust the digital signals output from the plurality of analog-to-digital converters 130-1 to 130-n. Each of the plurality of digital compensators 160-1 to 160-n may include an offset register OR and an offset compensator OCO.

In each of the digital compensators 160-1 to 160-n, the offset register OR may be configured to store an offset value for compensating a digital signal output from a corresponding analog-to-digital converter. The offset value stored at the offset register OR may be a predetermined or reference value. The offset value may be determined through a test of the image capture device 100. The offset compensator OCO may compensate a digital signal using an offset value stored at a corresponding offset register OR.

Offset values stored at the offset registers OR of the plurality of digital compensators 160-1 to 160-n may be independent from one another. Different offsets among the analog-to-digital converters 130-1 to 130-n may be compensated by compensating digital signals from the analog-to-digital converters 130-1 to 130-n using the offset compensators OCO.

The resolution of the offset values may be higher than that of digital signals from the analog-to-digital converters 130-1 to 130-n. For example, a bit number of each offset value may be more than that of values corresponding to each digital signal, where a bit number is a number of bits used to represent a value. For example, the bit number for the value '1111' (i.e., 4) is greater than the bit number for the value '111' (i.e., 3). That is, the digital signals may be compensated to have the resolution higher than the analog-to-digital converters 130-1 to 130-n. Thus, the digital signals may be compensated by the resolution higher than that obtained by compensating offsets of the analog-to-digital converters 130-1 to 130-n.

The data latch 140 may receive and store the compensated digital signals from the digital compensating circuit 160. The data latch 140 may output the stored digital signals in synchronization with an output signal of the horizontal decoder 150.

The digital processing circuit 170 may receive the compensated digital signals from the data latch 140 to generate image data.

The digital processing circuit 170 may control an overall operation of the image capture device 100. For example, the digital processing circuit 170 may generate the control signal CT1 such that the image sensor pixel array 110 reads image sensor pixels by a unit of at least one row or at least one column.

A location of the digital compensating circuit 160 is not limited to this disclosure. According to at least one example embodiment, the digital compensating circuit 160 can be placed between the analog-to-digital converters 130-1 to 130-n and the data latch 140.

Figure 2:
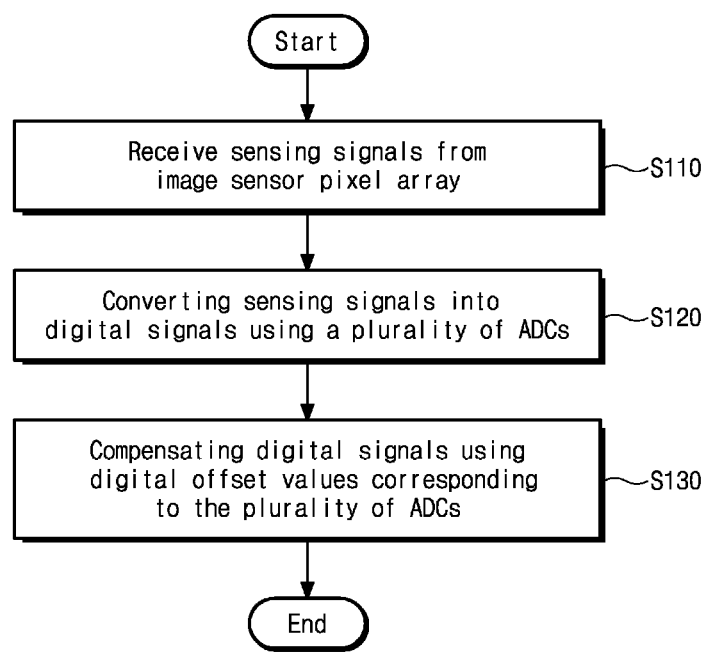
FIG. 2 is a flowchart illustrating a signal compensating method according to at least one example embodiment.

FIG. 2 is a flowchart illustrating a signal compensating method according to at least one example embodiment. Referring to FIGS. 1 and 2, in operation S110, sensing signals may be received from an image sensor pixel array 110. A plurality of analog-to-digital converters 130-1 to 130-n may receive the sensing signals from the image sensor pixel array 110 through a sample and hold array 120.

In operation S120, the sensing signals may be converted into digital signals via the analog-to-digital converters 130-1 to 130-n.

In operation S130, the digital signals may be compensated using offset values corresponding to the analog-to-digital converters 130-1 to 130-n, respectively. Offset compensators OCO of the digital compensators 160-1 to 160-n may compensate the digital signals from the analog-to-digital converters 130-1 to 130-n using offset values stored at offset registers OR. For example, the offset compensators OCO may compensate the digital signals by performing operations such as addition, subtraction, and the like of the digital signals and the offset values.

Figure 3:
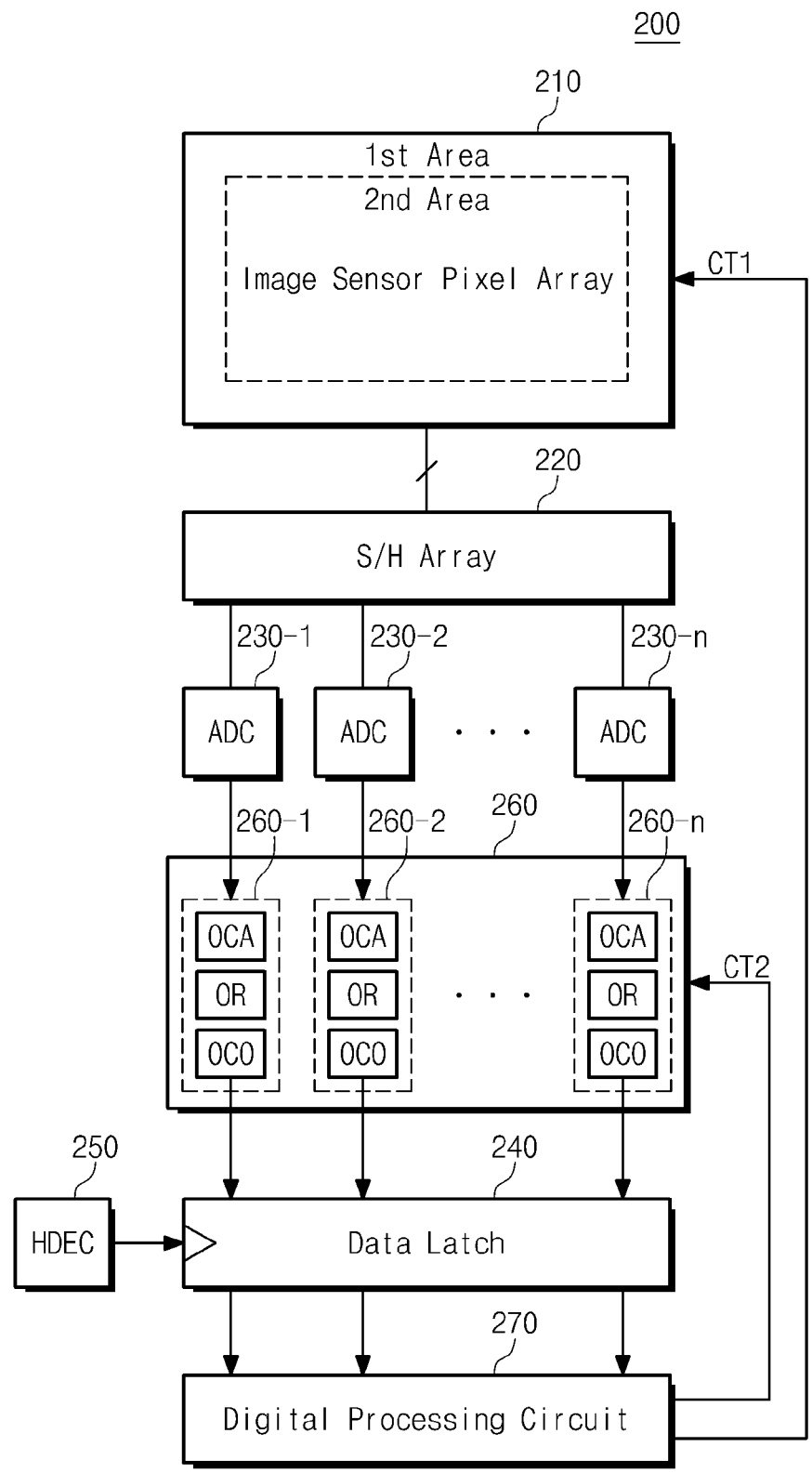
FIG. 3 is a block diagram schematically illustrating an image capture device according to at least one example embodiment.

FIG. 3 is a block diagram schematically illustrating an image capture device according to at least one example embodiment. Referring to FIG. 3, an image capture device 200 may include an image sensor pixel array 210, a sample and hold array 220, a plurality of analog-to-digital converters 230-1 to 230-n, a data latch 240, a horizontal decoder 250, a digital compensating circuit 260, and a digital processing circuit 270.

Compared with an image capture device 100 in FIG. 1, the digital processing circuit 270 of the image capture device 200 may be configured to output a control signal CT2 to the digital compensating circuit 260. The digital compensating circuit 260 may further include a plurality of offset calculators OCA.

The image sensor pixel array 210 may be divided into a first area and a second area. In the first area, image sensor pixels may not receive a light and output null signals as sensing signals, due to a structure such as a frame formed to surround the image sensor pixel array 210. The sensing signals being the null signals may be reference signals. In the second area, image sensor pixels may receive a light to output sensing signals. The digital processing circuit 270 may not use the sensing signals from the image sensor pixels in the first area to generate image data.

The digital processing circuit 270 may generate a control signal CT1 such that the image sensor pixel array 210 reads image sensor pixels by a unit of at least one row or at least one column. While the image sensor pixel array 210 reads image sensor pixels in the first area, the digital processing circuit 270 may activate the control signal CT2. While the image sensor pixel array 210 reads image sensor pixels in the second area, the digital processing circuit 270 may deactivate the control signal CT2.

When the control signal CT2 is activated, the digital compensating circuit 260 may calculate offset values. The offset calculators OCA in the digital compensators 260-1 to 260-$n$ may calculate offset values based on digital signals output from corresponding analog-to-digital converters.

For example, the offset calculator OCA may store a digital value of a sensing signal, corresponding to a null signal output from image sensor pixels of the first area, in advance. The offset calculator OCA may calculate an offset value by comparing a reference digital signal, obtained by converting a reference signal, with a beforehand stored signal (or, value). The offset calculator OCA may calculate an accumulated average of a difference between a reference digital signal, obtained by converting a reference signal, and a beforehand stored signal (or, value), as an offset value. The offset value may be stored at an offset register OR.

The resolution of the offset values may be higher than that of digital signals from the analog-to-digital converters 230-1 to 230-$n$. For example, a bit number of each offset value may be more than that of each digital signal.

When the control signal CT2 is inactivated, the digital compensating circuit 260 may compensate digital signals. The offset compensator OCO in the digital compensators 260-1 to 260-$n$ may compensate digital signals output from corresponding analog-to-digital converters using offset values stored at the offset registers OR.

Conductive lines connecting the sample and hold array 220 and the plurality of analog-to-digital converters 230-1 to 230-$n$ may form a signal transfer circuit which transfers the sensing signals to the plurality of analog-to-digital converters 230-1 to 230-$n$. Conductive lines connecting the sample and hold array 220 and the image sensor pixel array 210, the sample and hold array 220, and conductive lines connecting the sample and hold array 220 and the plurality of analog-to-digital converters 230-1 to 230-$n$ may form a signal transfer circuit which transfers the sensing signals to the plurality of analog-to-digital converters 230-1 to 230-$n$.

Figure 4:
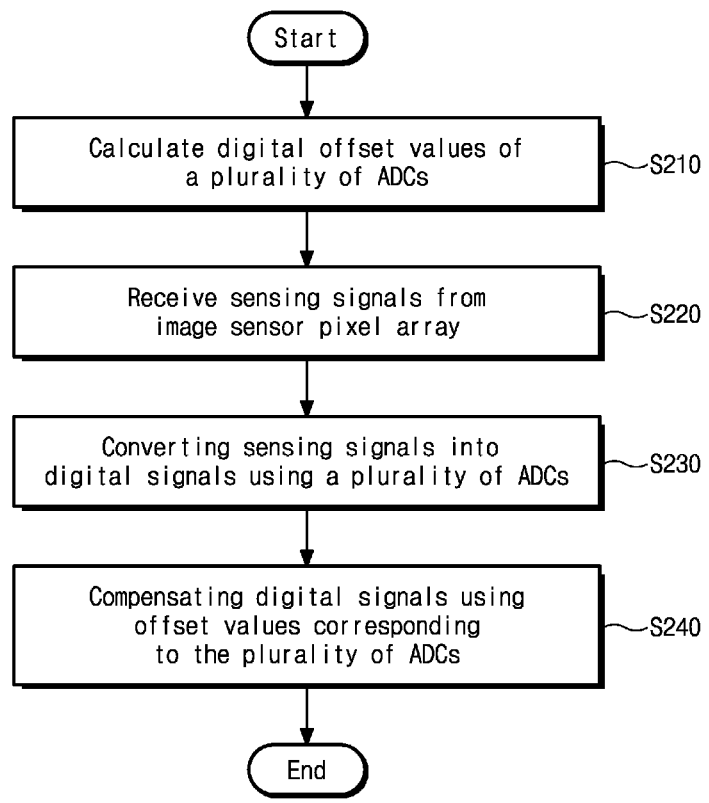
FIG. 4 is a flowchart illustrating a signal compensating method according to at least one example embodiment.

FIG. 4 is a flowchart illustrating a signal compensating method according to at least one example embodiment. Referring to FIGS. 3 and 4, in operation S210, offset values of a plurality of analog-to-digital converters 230-1 to 230-$n$ may be calculated. For example, when image sensor pixels in a first area are read, offset calculators OCA in digital compensators 260-1 to 260-$n$ may calculate offset values of the analog-to-digital converters 230-1 to 230-$n$, based on sensing signals.

In operation S220, the sensing signals may be received from an image sensor pixel array 210. In operation S230, the analog-to-digital converters 230-1 to 230-$n$ may convert the sensing signals into digital signals. In operation S240, digital signals may be compensated using offset values corresponding to the analog-to-digital converters 230-1 to 230-$n$. When image sensor pixels in a second area are read, operations S220 to S240 may be performed in the same manner as described in operations S110 to S130 in FIG. 2.

Figure 5:
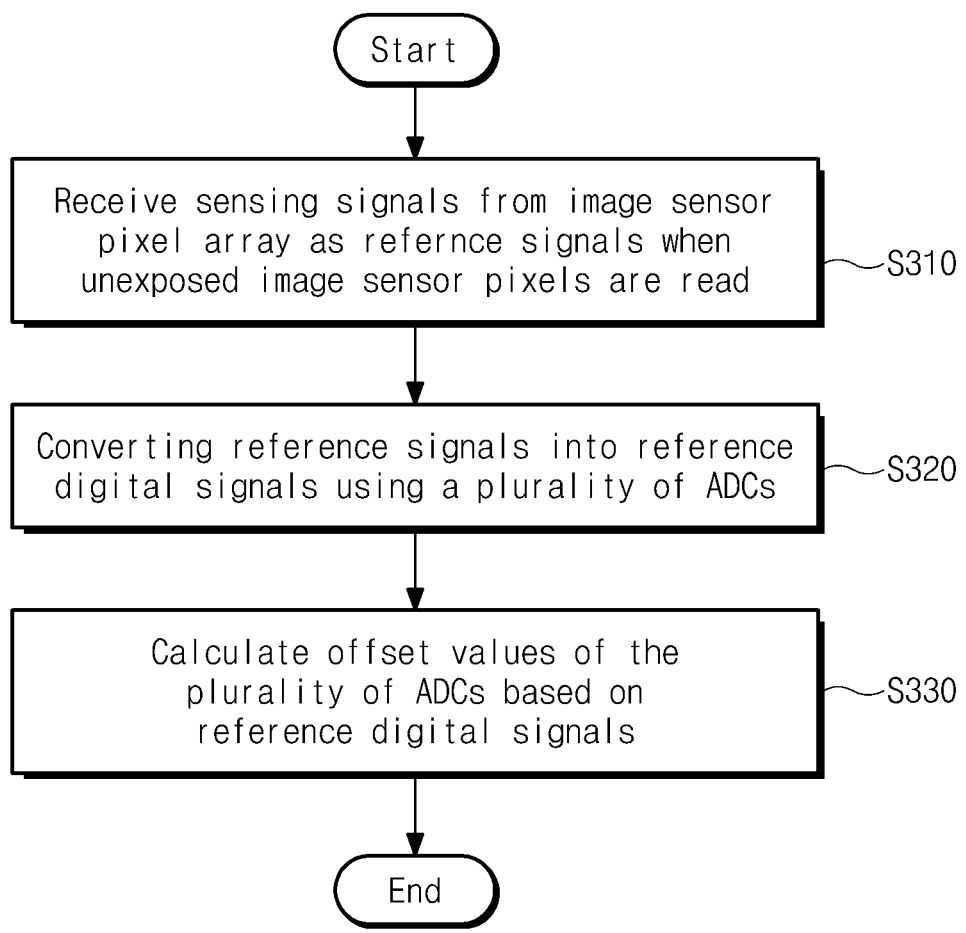
FIG. 5 is a flowchart illustrating an offset value calculating method according to at least one example embodiment.

FIG. 5 is a flowchart illustrating an offset value calculating method according to at least one example embodiment. Referring to FIGS. 3 to 5, in operation S310, when unexposed image sensor pixels are read, sensing signals may be received from an image sensor pixel array 210 as reference signals.

In operation S320, the reference signals may be converted into reference digital signals using a plurality of analog-to-digital converters 230-1 to 230-$n$.

In operation S330, offset values of the analog-to-digital converters 230-1 to 230-$n$ may be calculated according to the reference digital signals. Offset calculators OCA may calculate offset values by comparing the reference digital signals with a beforehand stored signal or a value representing the signal.

With at least one example embodiment, while unexposed image sensor pixels are read, offset values may be iteratively calculated and updated. Thus, optimum offset values may be calculated and applied according to deterioration of the analog-to-digital converters 230-1 to 230-$n$ or a change in peripheral environments such as temperature, humidity, and the like.

Figure 6:
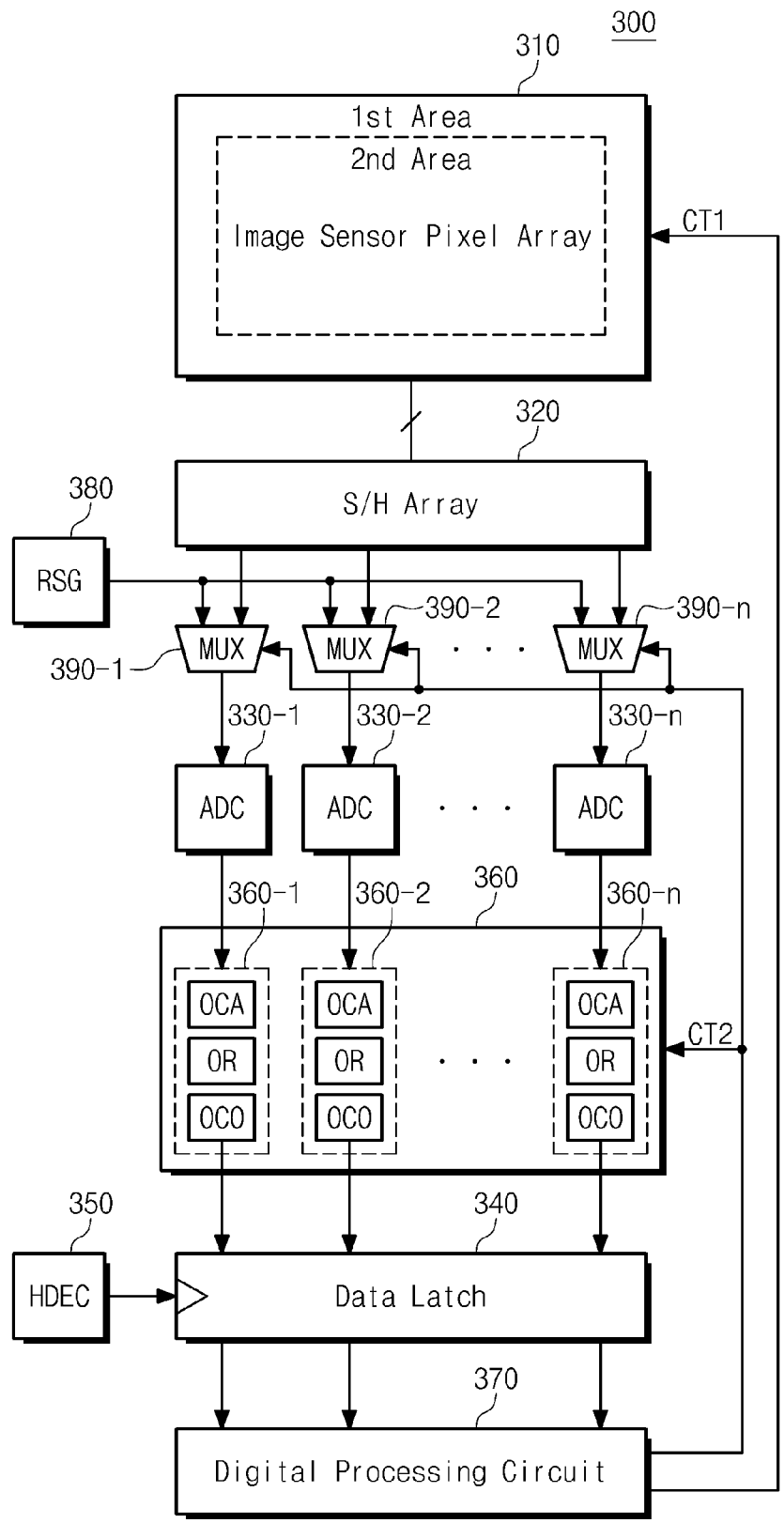
FIG. 6 is a block diagram schematically illustrating an image capture device according to at least one example embodiment.

FIG. 6 is a block diagram schematically illustrating an image capture device according to at least one example embodiment. Referring to FIG. 6, an image capture device 300 may include an image sensor pixel array 310, a sample and hold array 320, a plurality of analog-to-digital converters 330-1 to 330-$n$, a data latch 340, a horizontal decoder 350, a digital compensating circuit 360, a digital processing circuit 370, a reference signal generator 380, and a plurality of multiplexers 390-1 to 390-$n$.

Compared with an image capture device 200 in FIG. 3, the image capture device 300 may further include the reference signal generator 380 and the plurality of multiplexers 390-1 to 390-$n$.

The reference signal generator 380 may be configured to output a reference signal. The reference signal generator 380 may output a reference signal having a level within an input signal range of the analog-to-digital converters 330-1 to 330-$n$.

The plurality of multiplexers 390-1 to 390-$n$ may be connected with the plurality of analog-to-digital converters 330-1 to 330-$n$, respectively. Each of the multiplexers 390-1 to 390-$n$ may be configured to output a sensing signal or a reference signal to a corresponding analog-to-digital converter in response to a control signal CT2.

When image sensor pixels in a first area of the image sensor pixel array 310 are read, the control signal CT2 may be activated. When image sensor pixels in a second area of the image sensor pixel array 310 are read, the control signal CT2 may be inactivated.

When the control signal CT2 is activated, the plurality of multiplexers 390-1 to 390-$n$ may output reference signals to the analog-to-digital converters 330-1 to 330-$n$, respectively. The analog-to-digital converters 330-1 to 330-$n$ may convert the reference signals to output reference digital signals.

The digital compensators 360-1 to 360-$n$ of the digital compensating circuit 360 may calculate offset values. Each offset calculators OCA may store a digital value corresponding to a reference signal in advance. The offset calculator OCA may calculate an offset value by comparing reference digital signals, obtained by converting reference signals, with beforehand stored digital signals (or, values). The offset calculator OCA may calculate accumulated averages of differences between reference digital signals, obtained by converting a reference signal, and beforehand stored digital signals (or, values), as offset values. The offset values may be stored at offset registers OR.

The resolution of the offset values may be higher than that of digital signals from the analog-to-digital converters 330-1 to 330-$n$. For example, a bit number of each offset value may be more than that of each digital signal.

When the control signal CT2 is inactivated, the multiplexers 390-1 to 390-$n$ may output sensing signals to the analogto-digital converters 330-1 to 330-*n*. The analog-to-digital converters 330-1 to 330-*n* may convert the sensing signals into digital signals.

The digital compensators 360-1 to 360-*n* in the digital compensating circuit 360 may compensate digital signals using offset values. The compensation may be performed using, for example, the offset compensator OCO.

The multiplexers 390-1 to 390-*n* and conductive lines connecting the sample and hold array 320 and the plurality of analog-to-digital converters 330-1 to 330-*n* may form a signal transfer circuit which transfers the sensing signals to the plurality of analog-to-digital converters 330-1 to 330-*n*. Conductive lines connecting the sample and hold array 320 and the image sensor pixel array 310, the sample and hold array 320, conductive lines connecting the sample and hold array 320 and the plurality of analog-to-digital converters 330-1 to 330-*n*, and the multiplexers 390-1 to 390-*n* may form a signal transfer circuit which transfers the sensing signals to the plurality of analog-to-digital converters 330-1 to 330-*n*.

A signal compensating method of the image capture device 300 may be substantially the same as described with reference to FIG. 4.

Figure 7:
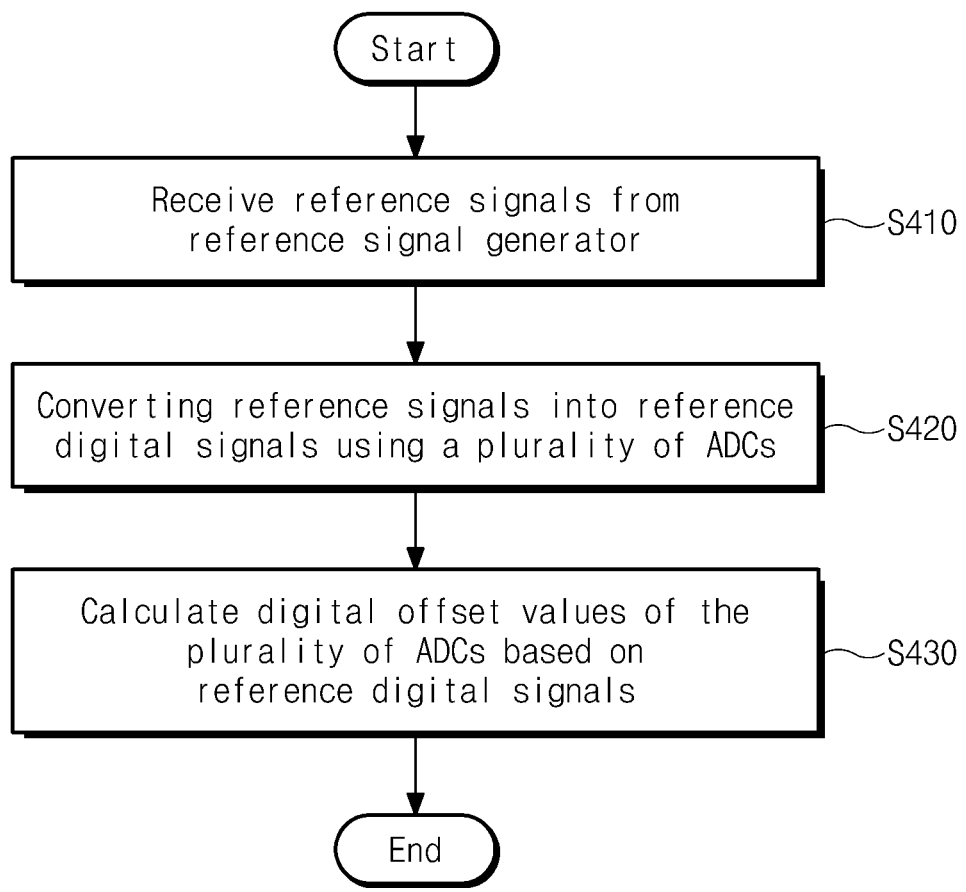
FIG. 7 is a flowchart illustrating an offset value calculating method according to at least one example embodiment.

FIG. 7 is a flowchart illustrating an offset value calculating method according to at least one example embodiment. Referring to FIGS. 4, 6, and 7, in operation S410, reference signals may be received from a reference signal generator 380. When a control signal CT2 is activated, a plurality of analog-to-digital converters 330-1 to 330-*n* may receive the reference signals through a plurality of multiplexors 390-1 to 390-*n*.

In operation S420, the reference signals may be converted into reference digital signals using a plurality of analog-to-digital converters 330-1 to 330-*n*.

In operation S430, offset values of the analog-to-digital converters 330-1 to 330-*n* may be calculated according to the reference digital signals. Offset calculators OCA in a plurality of digital compensators 360-1 to 360-*n* may calculate offset values by comparing the reference digital signals with beforehand stored digital signals (or, values).

According to at least one example embodiment, while unexposed image sensor pixels are read, offset values may be iteratively calculated and updated. Thus, optimum offset values may be calculated and applied according to deterioration of the analog-to-digital converters 330-1 to 330-*n* or a change in peripheral environments such as temperature, humidity, and the like.

Example embodiments may be described above with respect to examples in which a digital compensating circuit 160/260/360 is placed between the plurality of analog-to-digital converters 130-1 to 130-*n*/230-1 to 230-*n*/330-1 to 330-*n* and a data latch 140/240/340. However, according to at least one example embodiment, the digital compensating circuit 160/260/360 can be placed between the data latch 140/240/340 and a digital processing circuit 170/270/370.

Figure 8:
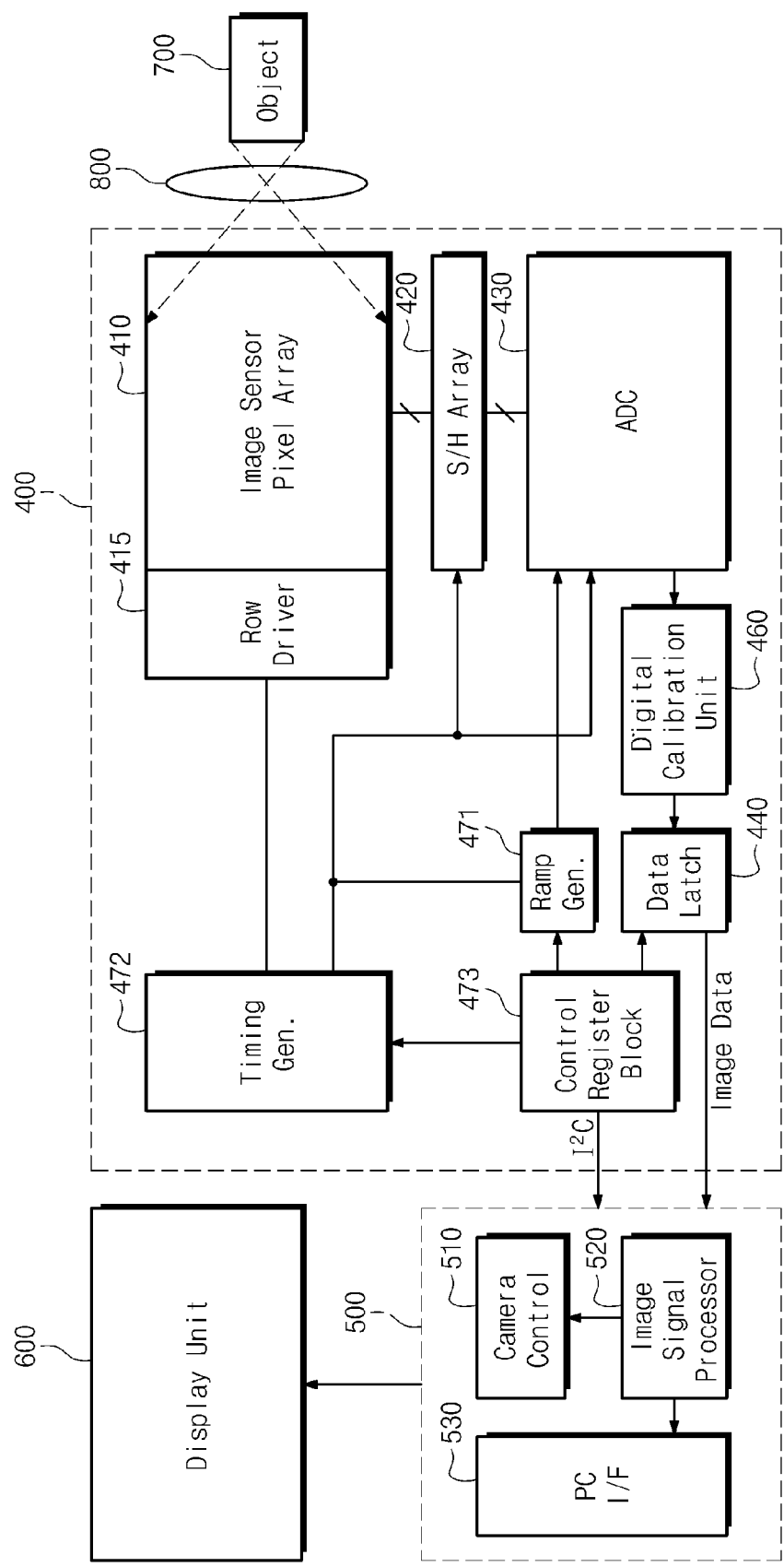
FIG. 8 is a block diagram schematically illustrating an image capture system according to at least one example embodiment.

FIG. 8 is a block diagram schematically illustrating an image capture system according to at least one example embodiment. Referring to FIG. 8, an image capture device 400 may include an image sensor pixel array 410, a row driver 415, a sample and hold array 420, an analog-to-digital converter 430, a data latch 440, a digital compensating circuit 460, a ramp signal generator 471, a timing generator 472, and a control register block 473.

As described with reference to FIGS. 1, 6, and 8, the analog-to-digital converter 430 may include a plurality of analog-to-digital converters. The digital compensating circuit 460 may compensate digital signals from the analog-to-digital converter 430 using offset values. According to at least one example embodiment, the digital compensating circuit may include the structure of any of the digital compensating circuits 160, 260, and 360 having the same operation discussed above with reference to FIGS. 1-7. Further, according to at least one example embodiment, a reference signal generator 380 and MUXs 390-1 to 390-*n* having the same structure and operation as that described above with reference to FIGS. 6 and 7 may be included in between the S/H Array 420 and the ADC 430. The data latch 440 may include a horizontal decoder 150/250/350. The data latch 440 may include a sense amplifier which senses and amplifies signals output from the digital compensating circuit 460. The ramp signal generator 471, the timing generator 472, and the control register block 473 may constitute a digital processing circuit 170/270/370.

The image capture device 400 may sense an object 700 taken through a lens 800 under the control of an image processor 500. The image processor 500 may output an image taken by the image capture device 400 to a display unit 600. At this time, the display unit 600 may be, for example, any device capable of outputting an image. For example, the display unit 600 may be a computer, a handheld phone, and an image output terminal.

The image processor 500 may include a camera control 510, an image signal processor 520, and PC I/F 530. The camera control 510 may control a control register block 473. The camera control 510 may control the control register block 473 using I2C (Inter-Integrated Circuit). However, example embodiments are not limited thereto.

The image signal processor 520 may receive image data being an output signal of the data latch 440, process the input image, and output the processed image to the display unit 600 through the PC I/F 530.

In FIG. 8, there may be illustrated an example that the image signal processor 520 is placed within the image processor 500. However, example embodiments are not limited thereto. For example, the image signal processor 520 can be placed within the image capture device 400. The image signal processor 520 and the image capture device 400 can be integrated to form a single chip.

The pixel array 410 may include a plurality of light sensing elements (e.g., photo diodes, pinned photo diodes, or the like). The pixel array 410 may sense a light using the plurality of light sensing elements, and may generate an image signal through conversion into an electrical signal.

The timing generator 472 may output control signals to the components 415, 430, and 471 to control operations of the components 415, 430, and 471. The control register block 473 may output control signals to the components 471, 472, and 440 to control operations thereof. The control register block 473 may operate under the control of the camera control 510.

The row driver 415 may drive the image sensor pixel array 410 by the row. For example, the row driver 415 may generate a row selection signal. The image sensor pixel array 410 may provide the sample and hold array 420 with a reset signal and an image signal from a row selected by the row selection signal provided from the row driver 415. The sample and hold array 420 may perform a sampling operation based on the reset signal and the image signal.

The analog-to-digital converter 430 may compare a ramp signal Vramp from the ramp signal generator 471 and a signal sampled by the sample and hold array 420, output a comparison result signal, and count the comparison result signal to output it to the digital compensating circuit 460.

The digital compensating circuit 460 may compensate a signal output from the analog-to-digital converter 430, using offset values. The compensated signal may be transferred to the data latch 440.

The data latch 440 may temporarily store a signal output from the digital compensating circuit 460. Also, the data latch 440 may sense and amplify the input signal to output it. The data latch 440 may include a plurality of column memory blocks (e.g., SRAM) each included at columns for temporary storing and a sense amplifier for sensing and amplifying a signal output from the digital compensating circuit 460.

With the above description, output signals of analog-to-digital converters may be compensated to have the resolution higher than that of analog-to-digital converters, at a digital stage. Thus, since offsets among the analog-to-digital converters are compensated with the high resolution, it is possible to provide an image capture device with improved reliability and a signal compensating method thereof.

Figure 9:
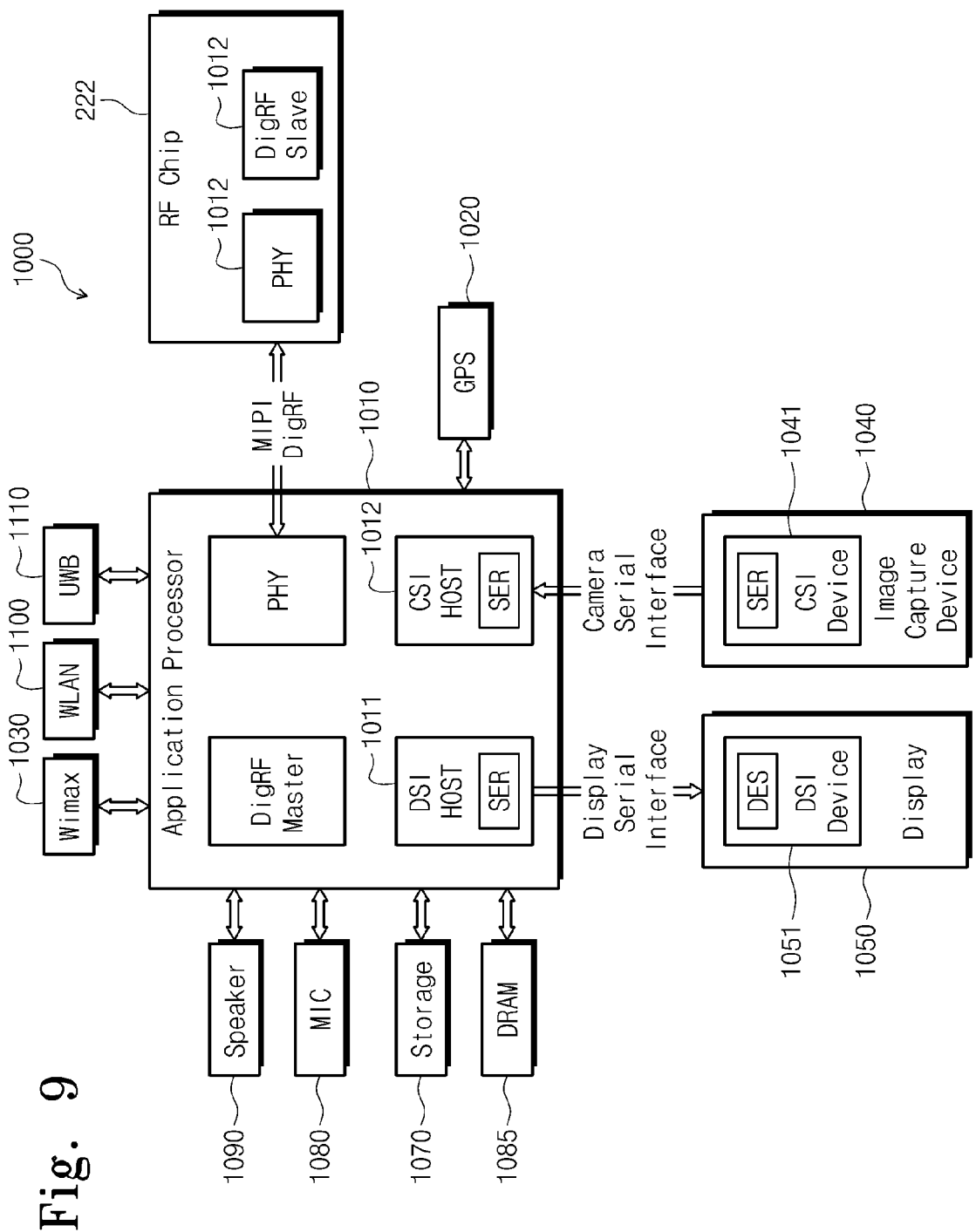
FIG. 9 is a block diagram schematically illustrating an electronic system including an image capture device according to at least one example embodiment.

FIG. 9 is a block diagram schematically illustrating an electronic system including an image capture device according to at least one example embodiment. Referring to FIG. 9, an electronic system 1000 may be a data processing device, capable of using or supporting an MIPI interface, such as a mobile phone, PDA, PMP, or smart phone.

The electronic system 1000 may include an application processor 1010, an image capture device 1040, and a display 1050. According to at least one example embodiment, the image capture device 1040 may include the structure of the image capture device 400 having the same operation as that discussed above with reference to FIG. 8.

A CSI host 1012 implemented at the application processor 1010 may perform serial communication with a CSI device 1041 of the image capture device 1040 through a Camera Serial Interface (CSI). For example, the CSI host 1012 may include an optical de-serializer, and the CSI device 1041 may include an optical serializer A DSI host 1011 implemented at the application processor 1010 may perform serial communication with a DSI device 1051 of the display 1050 through a Display Serial Interface (DSI). For example, the DSI host 1011 may include an optical serializer, and the DSI device 1051 may include an optical de-serializer.

The electronic system 1000 may further include an RF chip 1060 for communication with the application processor 1010. PHY 1013 of the electronic system 1000 and PHY 1061 of the RF chip 1060 may exchange data according to MIPI DigRF.

The electronic system 1000 may further include GPS 1020, storage 1070, microphone 1080, DRAM 1085, and speaker 1090. The electronic system 1000 may communicate using Wimax 1030, WLAN 1100, UWB 1110, and the like.

Figure 10:
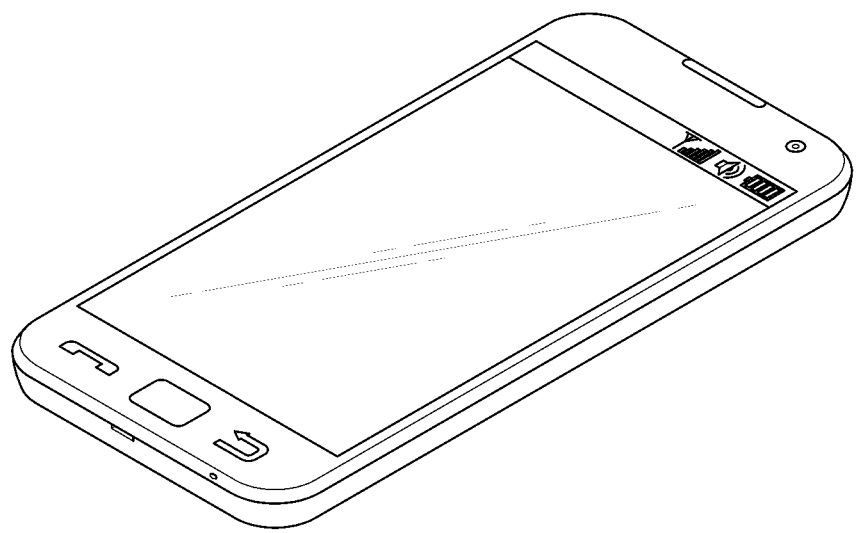
FIGS. 10 to 14 are diagrams illustrating multimedia devices to which an image capture device according to at least one example embodiment is applied.
Figure 11:
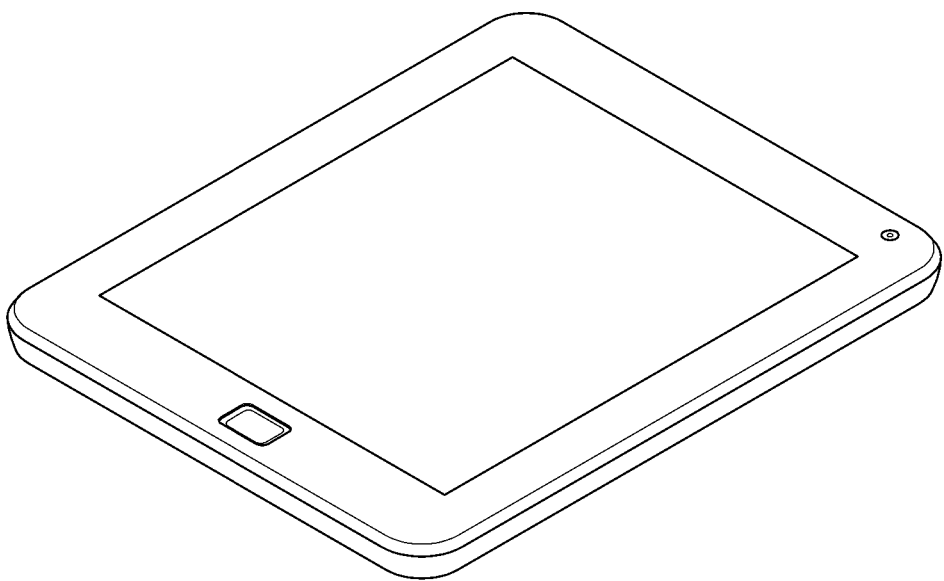
Figure 12:
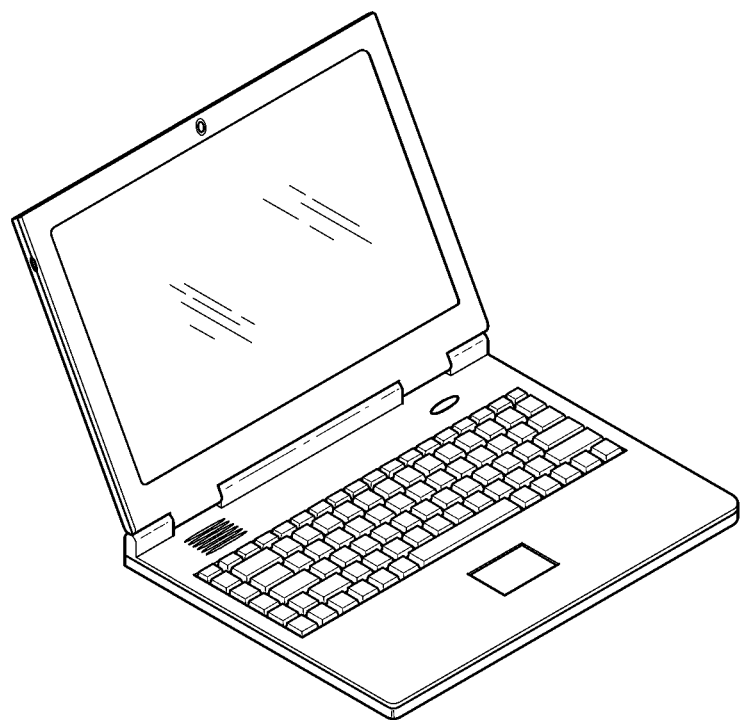
Figure 13:
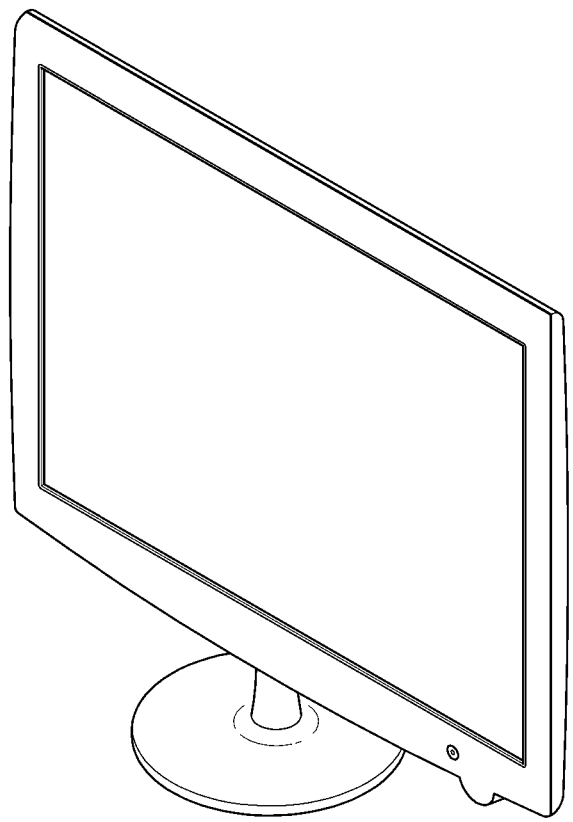
Figure 14:
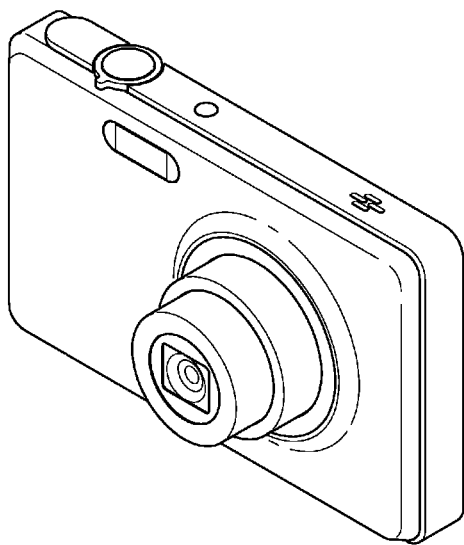

FIGS. 10 to 14 are diagrams illustrating multimedia devices to which an image capture device according to at least one example embodiment is applied. An image capture device 100/200/300/400 according to at least one example embodiment is applicable to various multimedia devices having an image capture function. For example, the image capture device 100/200/300/400 according to at least one example embodiment is applicable to a mobile phone or a smart phone 2000 as illustrated in FIG. 10. The image capture device 100/200/300/400 according to at least one example embodiment is applicable to a tablet or a smart tablet 3000 as illustrated in FIG. 11. Also, the image capture device 100/200/300/400 according to at least one example embodiment is applicable to a notebook computer 4000 as illustrated in FIG. 12 and to a television or a smart television 5000 as illustrated in FIG. 13. Also, the image capture device 100/200/300/400 according to at least one example embodiment is applicable to a digital camera or a digital camcorder 6000 as illustrated in FIG. 14.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A signal compensating method of an image capture device, comprising:
    receiving sensing signals from an image sensor pixel array;
    converting the sensing signals into digital signals using a plurality of analog-to-digital converters, respectively; and
    compensating the digital signals using offset values corresponding to the plurality of analog-to-digital converters, respectively, the offset values having resolutions higher than resolutions of the digital signals, the digital signals after the compensating having resolutions higher than resolutions of the digital signals before the compensating,
    wherein the signal compensating method further comprises:
    receiving reference signals from the image sensor pixel array when image sensor pixels of the image sensor pixel array that are not exposed to light are read;
    converting the reference signals into reference digital signals using the plurality of analog-to-digital converters;
    generating a plurality of difference values by comparing the reference digital signals to previously stored digital signals;
    generating a plurality of difference averages, the difference averages being averages of values from among the generated difference values; and
    before compensating the digital signals using the offset values, generating the offset values with respect to each of the plurality of analog-to-digital converters based on the difference averages.

2. The signal compensating method of claim 1, wherein a number of bits used to represent each of the offset values is more than a number of bits used to represent of each of the digital signals.

3. The signal compensating method of claim 1, wherein the offset values are reference values set before the sensing signals are received from the image sensor pixel array.

4. The signal compensating method of claim 1, wherein the offset values are generated based on an accumulated average of the reference digital signals.

5. An image capture device, comprising:
    an image sensor pixel array including a plurality of image sensor pixels;
    a signal transfer circuit configured to transfer sensing signals output from the image sensor pixel array;
    a plurality of analog-to-digital converters configured to convert output signals of the signal transfer circuit into digital signals, respectively; and
    a signal compensating circuit configured to compensate the digital signals output from the plurality of analog-to-digital converters using a plurality of offset values,
    wherein the signal compensating circuit includes a plurality of signal compensators corresponding to the plurality of analog-to-digital converters, respectively, and
    wherein each of the plurality of signal compensators includes,
        an offset register configured to store an offset value, from among the plurality of offset values, corresponding to the signal compensator, and
        an offset compensator configured to compensate a first digital signal output from a corresponding analog-todigital converter using the corresponding offset value stored in the offset register, the plurality of offset values having resolutions higher than resolutions of the digital signals, wherein a number of bits of each digital signal is less than a number of bits of each offset value, and wherein the number of bits of each digital signal is less than a number of bits of an output of each offset compensator.

6. The image capture device of claim 5, wherein each of the plurality of signal compensators further includes an offset calculator, wherein the plurality of analog-to-digital converters are configured to, receive reference signals from the image sensor pixel array when image sensor pixels of the image sensor pixel array that are not exposed to light are read, and convert the reference signals into reference digital signals, and wherein the plurality of offset calculators included in the plurality of signal compensators are configured to, generate a plurality of difference values by comparing the reference digital signals to previously stored digital signals, generate a plurality of difference averages, the difference averages being averages of values from among the generated difference values, and generate, before the digital signals are compensated using the plurality of offset values, the plurality offset values with respect to each of the plurality of analog-to-digital converters based on the difference averages.

7. The image capture device of claim 6, wherein, for each of the plurality of signal compensators, the offset register of the signal compensator is configured to store the corresponding offset value after the offset calculator of the signal compensator calculates the offset value.

8. The image capture device of claim 6, wherein the image capture device is configured such that the offset calculators calculate the plurality of offset values when unexposed image sensor pixels of the image sensor pixel array are read, and the offset compensators compensate the first digital signals when exposed image sensor pixels of the image sensor pixel array are read.

9. The image capture device of claim 6, wherein the signal transfer circuit comprises:

a plurality of multiplexers corresponding to the plurality of analog-to-digital converters, the plurality of multiplexers being configured to transfer either the sensing signals or first reference signals to the plurality of analog-to-digital converters.

10. The image capture device of claim 9, wherein the image capture device is configured such that the plurality of multiplexers transfer the reference signals if unexposed image sensor pixels of the image sensor pixel array are read and transfers the sensing signals if exposed image sensor pixels of the image sensor pixel array are read.

11. The image capture device of claim 9, wherein the image capture device is configured such that the offset calculator calculates the corresponding offset value if the signal transfer circuit transfers the first reference signals and compensates the digital signal if the signal transfer circuit transfers the sensing signals.

12. A method of operating an image sensor comprising:

receiving plurality of sensing signals from a pixel array of the image sensor;

converting the plurality of sensing signals into a plurality of digital signals using a plurality of analog-to-digital converters, respectively; and generating a plurality of compensated signals based on the plurality of digital signals and a plurality of offset values, the plurality of offset values corresponding to the plurality of analog-to-digital converters, respectively, the offset values having resolutions higher than resolutions of the first plurality of digital signals, wherein, for each one of the plurality of compensated signals, the compensated signal is generated by adding a first value to a first signal, the first value being one of the plurality of offset values, the first signal being one of the plurality of digital signals, a number of bits of the first value being more than a number of bits of the first signal, wherein the method further comprises:

receiving reference signals from the pixel array when pixels that are not exposed to light are read;

converting the reference signals into reference digital signals using the plurality of analog-to-digital converters;

generating a plurality of difference values by comparing the reference digital signals to previously stored digital signals;

generating a plurality of difference averages, the difference averages being averages of values from among the generated difference values; and before compensating the digital signals using the offset values, generating the offset values with respect to each of the plurality of analog-to-digital converters based on the difference averages.

13. The method of claim 12, wherein the reference signals are signals generated by one or more pixels of the pixel array, the one or more pixels of the pixel array being located in an area of the pixel array which is configured not to receive light.

* * * * *